US012688780B2

(12) United States Patent
Cho

(10) Patent No.: US 12,688,780 B2
(45) Date of Patent: Jul. 21, 2026

(54) DEVICE AND METHOD FOR CONTROLLING VEHICLE PLATOONING

(71) Applicant: HYUNDAI MOBIS CO., LTD., Seoul (KR)

(72) Inventor: Chang Ho Cho, Seoul (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 133 days.

(21) Appl. No.: 18/214,590

(22) Filed: Jun. 27, 2023

(65) Prior Publication Data

US 2024/0029569 A1 Jan. 25, 2024

(30) Foreign Application Priority Data

Jul. 22, 2022 (KR) ........................ 10-2022-0090918

(51) Int. Cl.
G08G 1/00 (2006.01)
B60W 30/16 (2020.01)
(Continued)

(52) U.S. Cl.
CPC ............... G08G 1/22 (2013.01); B60W 30/16 (2013.01); B60W 30/18163 (2013.01);
(Continued)

(58) Field of Classification Search
CPC ........... G08G 1/00; G08G 1/22; B60W 30/00; B60W 60/00; B60W 2552/00; B60W 2554/00; B60W 30/16; B60W 30/18163; B60W 60/001; B60W 2552/15; B60W 2552/30; B60W 2554/80; B60W 2555/20;
(Continued)

(56) References Cited

U.S. PATENT DOCUMENTS

2010/0256852 A1* 10/2010 Mudalige ............... G08G 1/163
701/24
2018/0012491 A1 1/2018 Liu et al.
(Continued)

FOREIGN PATENT DOCUMENTS

CN 113978464 A 1/2022
EP 3 351 025 B1 4/2020
(Continued)

OTHER PUBLICATIONS

Park, "KR20170119063A Translation", Oct. 26, 2017 (Year: 2017).*
(Continued)

*Primary Examiner* — Aniss Chad
*Assistant Examiner* — Elizabeth J Slowik
(74) *Attorney, Agent, or Firm* — Morgan, Lewis & Bockius LLP

(57) ABSTRACT

A device and a method for controlling vehicle platooning are disclosed.

The method of controlling a vehicle for assisting leaving from a vehicle platoon. The method comprises receiving a leave-request message including an overtaking intention from a first vehicle included in the vehicle platoon. The method comprises determining approval for the first vehicle to leave based on an expected time required for another vehicle in an adjacent lane to reach a position parallel to a position of the first vehicle. The method comprises transmitting a leave-approval message to the first vehicle.

13 Claims, 8 Drawing Sheets

(51) Int. Cl.
   B60W 30/18           (2012.01)
   B60W 60/00           (2020.01)

(52) U.S. Cl.
   CPC ....... B60W 60/001 (2020.02); B60W 2552/15
      (2020.02); B60W 2552/30 (2020.02); B60W
      2554/80 (2020.02); B60W 2555/20 (2020.02);
                           B60W 2756/10 (2020.02)

(58) Field of Classification Search
   CPC ......... B60W 2756/10; B60W 2556/65; B60W
                  30/165; B60W 60/0053; B60W 50/10;
                  B60W 50/14; B60W 60/0025; B60W
                  60/0057; B60W 2050/143; B60W
                  2552/20; B60W 2554/40; B60W
                                           2720/106
   See application file for complete search history.

(56)            References Cited

U.S. PATENT DOCUMENTS

| | | | | |
|---|---|---|---|---|
| 2020/0027355 | A1* | 1/2020 | Sujan | ........................ G08G 1/22 |
| 2020/0090521 | A1* | 3/2020 | Kim | ......................... H04W 4/46 |

| | | | | |
|---|---|---|---|---|
| 2020/0183420 | A1 | 6/2020 | Kim | |
| 2020/0286387 | A1 | 9/2020 | Zhou et al. | |
| 2020/0401160 | A1* | 12/2020 | Lacaze | ................... B60W 30/16 |
| 2021/0110720 | A1* | 4/2021 | Bang | ................... G05D 1/0293 |
| 2022/0415179 | A1* | 12/2022 | Kumar | ............ G08G 1/096791 |
| 2023/0063010 | A1* | 3/2023 | Zhang | ..................... H04W 4/40 |
| 2023/0322256 | A1* | 10/2023 | Haefner | .................. H04W 4/46 |
| | | | | 701/23 |
| 2023/0351897 | A1* | 11/2023 | Schlueter | ............. G05D 1/0293 |
| 2024/0010237 | A1* | 1/2024 | Song | ................. B60W 30/0956 |

FOREIGN PATENT DOCUMENTS

| | | | |
|---|---|---|---|
| KR | 10-2017-0119063 | A | 10/2017 |
| SE | 1650339 | A1 | 9/2017 |
| WO | 2017/164792 | A1 | 9/2017 |

OTHER PUBLICATIONS

Office Action issued on Oct. 1, 2024 in European Patent Application No. 23182606.6.

European Search Report issued on Nov. 22, 2023 in European Patent Application No. 23182606.6.

* cited by examiner

LEAVE-REQUEST
MESSAGE

LEAVE-APPROVAL
MESSAGE

1

DEVICE AND METHOD FOR CONTROLLING VEHICLE PLATOONING

CROSS REFERENCE TO RELATED APPLICATION

The present application is based on and claims the benefit of priority to Korean Patent Application Number 10-2022-0090918, filed on Jul. 22, 2022 in the Korean Intellectual Property Office, the entire disclosure of which is incorporated herein by reference.

TECHNICAL FIELD

The present disclosure relates to a method and device for controlling a vehicle platooning.

BACKGROUND

The statements in this section merely provide background information related to the present disclosure and may not constitute prior art.

An autonomous vehicle refers to a vehicle that can operate on its own without a driver or passenger operation, and an automated vehicle system refers to a system that monitors and controls the autonomous vehicle so that the autonomous vehicle can operate on its own.

As a technology regarding the autonomous vehicle is advanced, a platooning technology, in which several vehicles form groups and travel autonomously, is being researched.

A vehicle platooning function refers to a function in which a plurality of vehicles travel in a group or group form by maintaining a close distance between vehicles through vehicle distance control.

In the platooning, a vehicle group includes a leader vehicle located at the forefront of the platoon and a following vehicle or member vehicle following the leader vehicle.

One or more following vehicles in the vehicle group receive travel information of the leader vehicle and follow the leader vehicle or each preceding vehicle based on the received travel information. A plurality of vehicles exchange movement and abnormal situation information of vehicles through inter-vehicle communication within a group, and maintain distances between vehicles based on the exchanged information.

Vehicle platooning may be achieved through vehicle-to-everything (V2X) communication or vehicle-to-vehicle (V2V) communication.

When a vehicle group is formed, there is an advantage in that vehicles in the group reduce fuel consumption due to air resistance and increase a road usage rate according to a narrow gap between vehicles.

This vehicle platooning method is performed by control logic including join, leave, merge, split, and lane change. The vehicle platooning method may further include other logics.

As a leaving logic of the vehicle platooning, a following vehicle intending to leave from a vehicle group may leave the vehicle group by sending a leaving notification to the leader vehicle and moving to the left or right lane of the following vehicle. At a leaving point of the following vehicle, the preceding vehicle and the following vehicle move to close the gap between the vehicles. Vehicles that have left the vehicle group travel by being split with the vehicle group.

However, the conventional leaving process of vehicle platooning does not specifically suggest a process by which the following vehicle can safely leave based on the relationship of the vehicle group with surrounding vehicles, or a process of travel between the vehicle that left the vehicle group and the vehicle group.

According to the conventional leaving process, there is a problem in that a member vehicle trying to leave a vehicle group may collide with a vehicle adjacent to the vehicle group, and may cause traffic congestion by traveling inefficiently, such as traveling side by side with the vehicle group.

SUMMARY

According to at least one embodiment, the present disclosure provides a method of controlling a vehicle for assisting leaving from a vehicle platoon. The method comprises receiving a leave-request message including an overtaking intention from a first vehicle included in the vehicle platoon. The method comprises determining approval for the first vehicle to leave based on an expected time required for another vehicle in an adjacent lane to reach a position parallel to a position of the first vehicle. The method comprises transmitting a leave-approval message to the first vehicle.

According to another embodiment of the present disclosure, a device for controlling a vehicle for assisting leaving from a vehicle platoon is provided. The device comprises a communication module configured to communicate with at least vehicles set to the vehicle platoon. The device comprises a controller configured to receive a leave-request message including an overtaking intention from a first vehicle included in the vehicle platoon through the communication module, determine approval for the first vehicle to leave based on an expected time required for another vehicle in an adjacent lane to reach a position parallel to a position of the first vehicle, and transmit a leave-approval message to the first vehicle.

DETAILED DESCRIPTION

Figure 1:
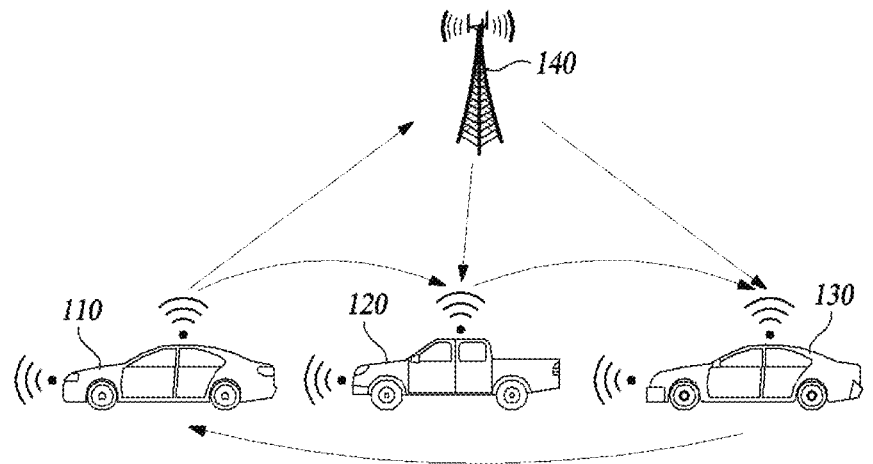
FIG. 1 is a diagram schematically describing platooning between a plurality of vehicles according to one embodiment of the present disclosure.

A method and a device for controlling a vehicle platoon according to one embodiment may assist leaving of a member vehicle trying to leave a vehicle platoon from the vehicle platoon so that the member vehicle safely and quickly overtakes the vehicle platoon through an adjacent lane.

The method and the device for controlling a vehicle platoon according to one embodiment can reduce a time for a vehicle that has left the vehicle platoon to overtake the vehicle platoon, thereby smoothing traffic flow.

The problems to be solved by the present disclosure are not limited to the problems mentioned above, and other problems not mentioned will be clearly understood by those skilled in the art from the description below.

Embodiments of the present disclosure are described below in detail using various drawings. It should be noted that when reference numerals are assigned to components in each drawing, the same components have the same reference numerals as much as possible, even if they are displayed on different drawings. Furthermore, in the description of the present disclosure, where it has been determined that a specific description of a related known configuration or function may obscure the gist of the disclosure, a detailed description thereof has been omitted.

In describing the components of the embodiments according to the present disclosure, symbols such as first, second, i), ii), a), and b) may be used. These symbols are only used to distinguish components from other components. The identity or sequence or order of the components is not limited by the symbols. In the specification, when a part "includes" or is "equipped with" an element, this means that the part may further include other elements, not excluding other elements unless explicitly stated to the contrary. Further, when an element in the written description and claims is described as being "for" performing or carry out a stated function, step, set of instructions, or the like, the element may also be considered as being "configured to" do so.

Each component of a device or method according to the present disclosure may be implemented in hardware or software, or in a combination of hardware and software. In addition, the functions of each component may be implemented in software. A microprocessor or processor may execute functions of the software corresponding to each component.

FIG. 1 is a diagram schematically describing platooning between a plurality of vehicles according to one embodiment of the present disclosure.

Referring to FIG. 1, a plurality of vehicles 110, 120, 130 and a roadside device 140 are illustrated.

The plurality of vehicles 110, 120, and 130 may travel while forming a vehicle platoon.

The plurality of vehicles 110, 120, and 130 may include a leader vehicle 110 and member vehicles 120 and 130. The leader vehicle 110 refers to a vehicle that informs other vehicles that platooning is possible and manages a vehicle group. The member vehicles 120 and 130 may be following vehicles that follow the leader vehicle 110. The member vehicles 120 and 130 receive platooning information from the leader vehicle 110 and perform platooning based on the platooning information.

The platooning information includes at least one of the number of vehicles, a minimum space-gap, a time-gap between vehicles in the vehicle platoon, a time-gap between vehicle platoons, a response time, a maximum speed, a target speed, a maximum acceleration, a maximum deceleration, an optimum acceleration, an optimum deceleration, a speed control gain, an acceleration gain, a speed gain, and a communication frequency. The platooning information may further include target positions, target directions, and target accelerations of vehicles.

The vehicle control device according to one embodiment of the present disclosure may be provided in at least one of the leader vehicle 110 and an external server. The vehicle control device generates and transmits a control message for controlling the plurality of vehicles 110, 120, and 130.

In one embodiment of the present disclosure, the vehicle control device provided in the leader vehicle 110 may generate the platooning information and share the platooning information with member vehicles 120 and 130. In another embodiment of the present disclosure, a vehicle control device provided in an external server (not illustrated) may collect travel information such as a vehicle type, a vehicle length, and a vehicle size from the plurality of vehicles 110, 120, and 130, generate the platooning information based on the collected travel information, and transmit the platooning information to the leader vehicle 110 through a wireless network.

The control message including platooning information may be a message which sets a destination of the leader vehicle 110, changes a travel mode, controls a drive device or brake device to change speed, or controls a steering device to change travel direction.

Figure 2:
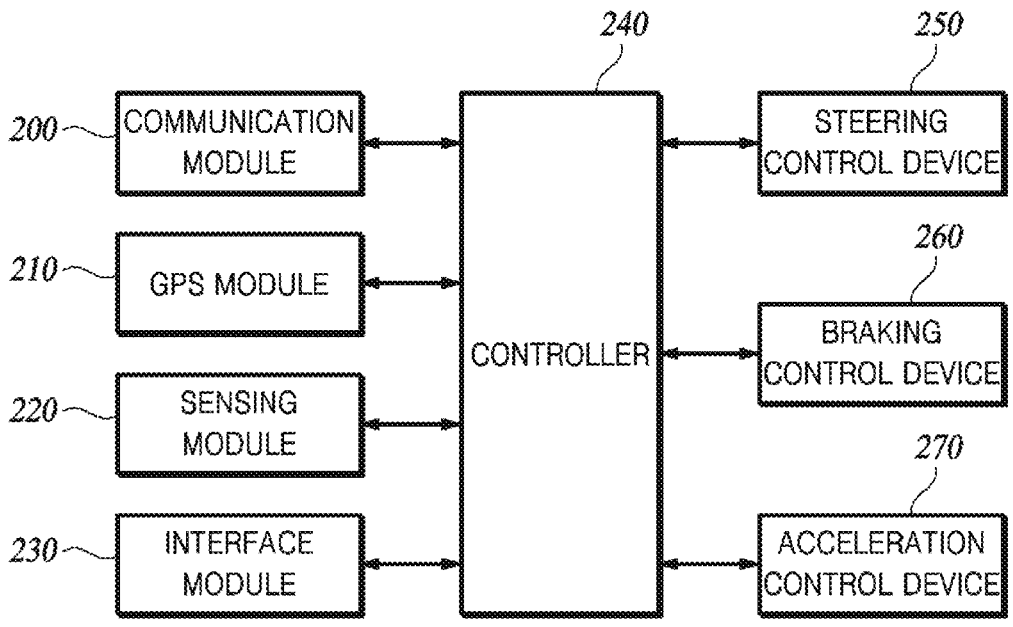
FIG. 2 is a configuration diagram of a vehicle control device according to one embodiment of the present disclosure.

FIG. 2 is a configuration diagram of a vehicle control device according to one embodiment of the present disclosure.

Referring to FIG. 2, the vehicle control device includes a communication module 200, a Global Positioning System (GPS) module 210 and a controller 240. The vehicle control device may further include at least one of a sensing module 220, an interface module 230, a steering control device 250, a braking control device 260, and an acceleration control device 270. The vehicle control device may further include a storage unit (not illustrated) for storing travel information received from other vehicles through the communication module 200 and information generated by the controller 240.

The vehicle control device may be provided in the leader vehicle, the member vehicle, or the external server. Hereinafter, each component will be described based on the vehicle control device mounted on a leader vehicle.

The communication module 200 may receive travel information from member vehicles and surrounding vehicles, or receive travel information from the member vehicles and surrounding vehicles through a server. When the server processes the travel information, the communication module 200 may receive the travel information processed by the server. The communication module 200 may receive road information, traffic information, and weather information from an external server.

The communication module 200 may include an internal communication unit and an external communication unit.

The internal communication unit may transmit or receive data using various communication protocols existing in the vehicle. Here, the communication protocol may include at least one of a Controller Area Network (CAN), a CAN with Flexible Data rate (CAN FD), an Ethernet, a Local Interconnect Network (LIN), and FlexRay. The communication protocol may include other protocols for communication between various devices mounted on the vehicle.

The external communication unit is a vehicular ad hoc network (VANEF) communication technology, Wireless Access in Vehicular Environments (WAVE) communication technology, Dedicated Short Range Communication (DSRC) technology, a Communication Access in Land Mobile (CALM) communication technology, a Vehicle-to- Vehicle (V2V) communication technology, a Vehicle-to-Infrastructure (V2I) communication technology, a Vehicle-to-Network (V2N) communication technology, a Wireless LAN (WLAN) communication technology, a Wireless-Fidelity (Wi Fi) communication technology, a Long Term Evolution (LTE) communication technology, a Long Term Evolution-Advanced (LTE-A) communication, a 5G communication technology, a 6G communication technology, a Ultra Wideband (UWB) communication technology, a Zig-Bee communication technology, and a Near Field Communication (NFC) communication technology.

The communication module 200 may include at least one of a transmission antenna, a reception antenna, a radio frequency (RF) circuit capable of implementing various communication protocols, a transceiver, and an RF element. According to an exemplary embodiment of the present disclosure, the communication module 200 may include a processor (e.g., computer, microprocessor, CPU, ASIC, circuitry, logic circuits, etc.) and an associated non-transitory memory storing software instructions which, when executed by the processor, provides the functionalities described here. Herein, the memory and the processor may be implemented as separate semiconductor circuits. Alternatively, the memory and the processor may be implemented as a single integrated semiconductor circuit. The processor may embody one or more processor(s), The communication module 200 may perform communication with a terminal of a passenger.

The communication module 200 may perform communication between member vehicles included in the vehicle platoon and communication between vehicle platoons. The communication module 200 may perform communication with road infrastructure as well as vehicle-to-vehicle communication. The communication module 200 may perform transmission and reception so that platooning information is shared.

The GPS module 210 receives GPS information of a vehicle equipped with a vehicle control device. The controller 240 can accurately determine the current location of the vehicle based on the GPS information received by the GPS module 210.

The sensing module 220 may include, in the vehicle, a plurality of sensors to detect an interval between the platooning vehicles, a relative speed, a relative distance, a lane information, and an object outside the vehicle.

The sensing module 200 may include an ultrasonic sensor, a radar, a camera, a laser scanner and/or a corner radar, a lidar, an acceleration sensor, a yaw rate sensor, a torque measurement sensor and/or a wheel speed sensor, a steering angle sensor, and the like. In order to obtain vehicle travel information, the sensing module 220 may further include a heading sensor, a yaw sensor, a gyro sensor, a vehicle forward/backward sensor, a wheel sensor, a vehicle body slope detection sensor, a battery sensor, a fuel sensor, a tire sensor, a temperature sensor inside the vehicle, a humidity sensor inside the vehicle, a door sensor, and the like.

The sensing module 220 may include a camera.

The camera captures a scene around the vehicle as an image. Furthermore, the camera detects vehicles around the vehicle platoon in the image. Depending on an angle of view of the camera, the camera may acquire not only the front of the vehicle, but also side and rear images. The camera may transmit the acquired image information to the controller 240 or may process image information.

When the camera directly processes image information, the camera may include an image sensor and an image processing module. The camera may process still images or moving images obtained by an image sensor (for example, CMOS or CCD).

The steering control device 250 may be configured to control a steering angle of the vehicle, and may include a steering wheel, an actuator interlocked with the steering wheel, and a controller controlling the actuator.

The braking control device 260 may be configured to control braking of the vehicle and may include a controller for controlling the brake.

The acceleration control device 270 may be configured to control engine driving or motor driving of the vehicle, and may accelerate the vehicle.

The interface module 230 provides necessary information to the passenger or receives a predetermined request from the passenger.

The interface module 230 may be implemented as a device capable of transmitting and receiving various sensory information such as human hearing, sight, and touch. For example, the interface module 230 may include a User Setting Mode (USM) device or a Human-Machine Interaction (HMI) device.

The controller 240 receives information on the member vehicle through the communication module 200, generates the platooning information, and transmits the platooning information to the member vehicle.

According to one embodiment of the present disclosure, the controller 240 receives a leave-request message including an overtaking intention from the member vehicle. The controller 240 determines approval for the member vehicle to leave based on at least one of an expected time required for another vehicle in an adjacent lane to reach a position parallel to a position of the member vehicle requesting the leaving, or a time required for the member vehicle to take the vehicle platoon. The controller 240 transmits the leave-approval message to the member vehicle. When the leaving of the member vehicle is approved, the controller 240 may control the speed of the vehicle platoon or provide a sufficient distance from the preceding vehicle in front of the vehicle platoon to assist the overtaking of the leaving vehicle. The leaving vehicle may move to the adjacent lane and change the lane to a point in front of the vehicle platoon.

The controller 240 may be electrically connected to the communication module 200, the sensing module 220, or the like and electrically control each component, and may be an electric circuit that executes software commands and thus, perform various data processing and calculations described later.

Figure 3:
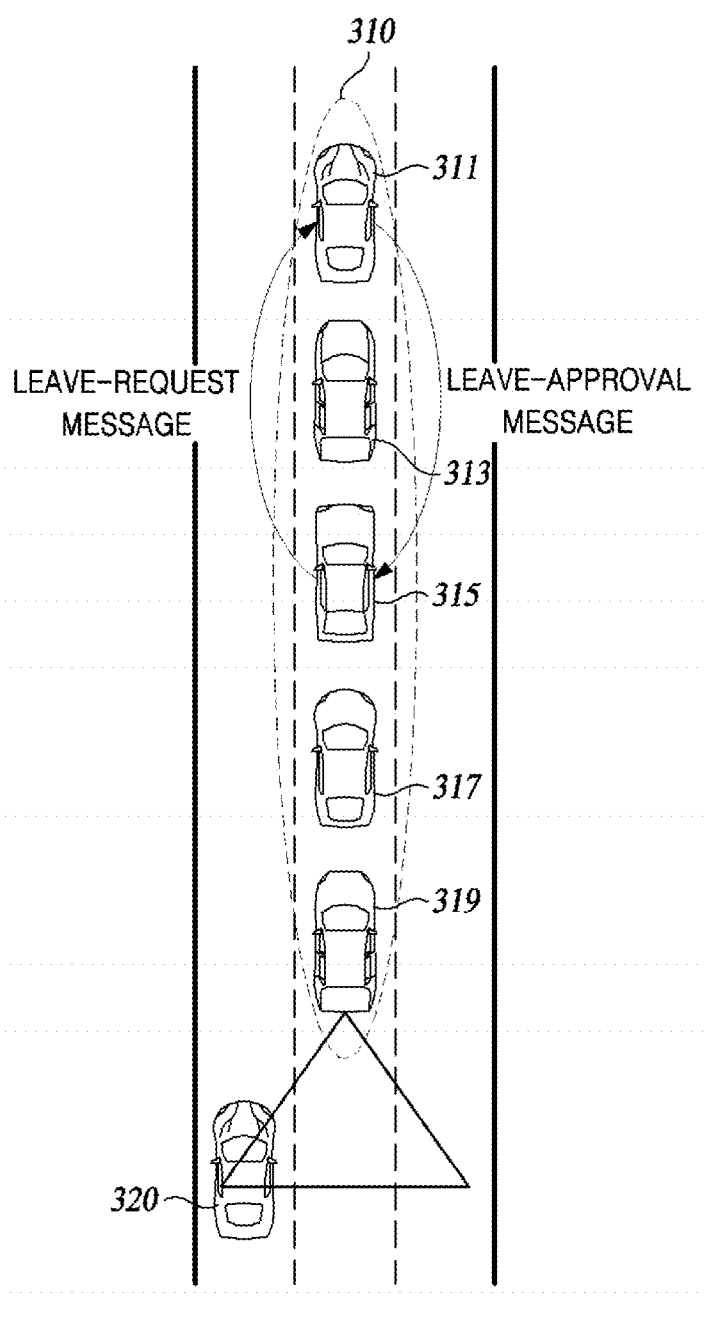
FIG. 3 is a diagram schematically illustrating an auxiliary operation for leaving a vehicle platoon according to one embodiment of the present disclosure.

FIG. 3 is a diagram schematically illustrating an auxiliary operation for leaving the vehicle platoon according to one embodiment of the present disclosure.

Referring to FIG. 3, a vehicle platoon 310, a plurality of vehicles 311, 313, 315, 317, and 319, and another vehicle 320 are illustrated. The plurality of vehicles 311, 313, 315, 317, and 319 include a leader vehicle 311 and member vehicles 313, 315, 317, and 319.

The leader vehicle 311 generates travel information of the vehicle platoon 310 and transmits the travel information to member vehicles 313, 315, 317, and 319. The leader vehicle and member vehicles 313, 315, 317, and 319 perform the platooning based on the travel information.

The vehicle platoon 310 can travel in the middle lane for traffic flow. During the platooning, each of the member vehicles 313, 315, 317, and 319 may sense surrounding vehicles or perform wireless communication with surrounding vehicles. For example, when the other vehicle 320 is traveling in a first lane that is an overtaking lane, the fourth member vehicle 319 may detect the other vehicle 320 using at least one sensor. The fourth member vehicle 319 may transmit information on the other vehicle 320 collected using a sensor or communication module to the leader vehicle 311 and other member vehicles.

Meanwhile, some of the member vehicles 313, 315, 317, and 319 may want to leave the vehicle platoon 310. For example, it may be necessary to leave the vehicle platoon 310 for the purpose of refueling, vehicle breakdown, change of destination, change of travel route, and the like.

When the second member vehicle 315 wants to leave the vehicle platoon 310, the second member vehicle 315 transmits a leave-request message to the leader vehicle 311. The second member vehicle 315 may transmit the leave-request message including an overtaking intention. The leader vehicle 311 may predict that the second member vehicle 315 will change lanes to an adjacent overtaking lane in response to receiving the leave-request message including the overtaking intention.

When the leader vehicle 311 immediately approves the leave-request message, a collision between the second member vehicle 315 and the other vehicle 320 may occur due to the lane change of the second member vehicle 315.

In order to prevent such a collision, the leader vehicle 311 determines the approval of the leaving of the second member vehicle 315 in response to receiving the leave-request message. The leader vehicle 311 may approve for the second member vehicle 315 to leave, based on the predicted risk of collision between the vehicle platoon 310 and the other vehicle 320 in an adjacent lane in response to the lane change of the second member vehicle 315. When the leaving approval is determined, the leader vehicle 311 transmits the leave-approval message to the second member vehicle 315.

The second member vehicle 315 safely changes the lane and may be split from the vehicle platoon 310 to travel. The second member vehicle 315 may move such that a time required to overtake the vehicle platoon 310 is minimized based on a speed of the vehicle platoon 310.

Figure 4:
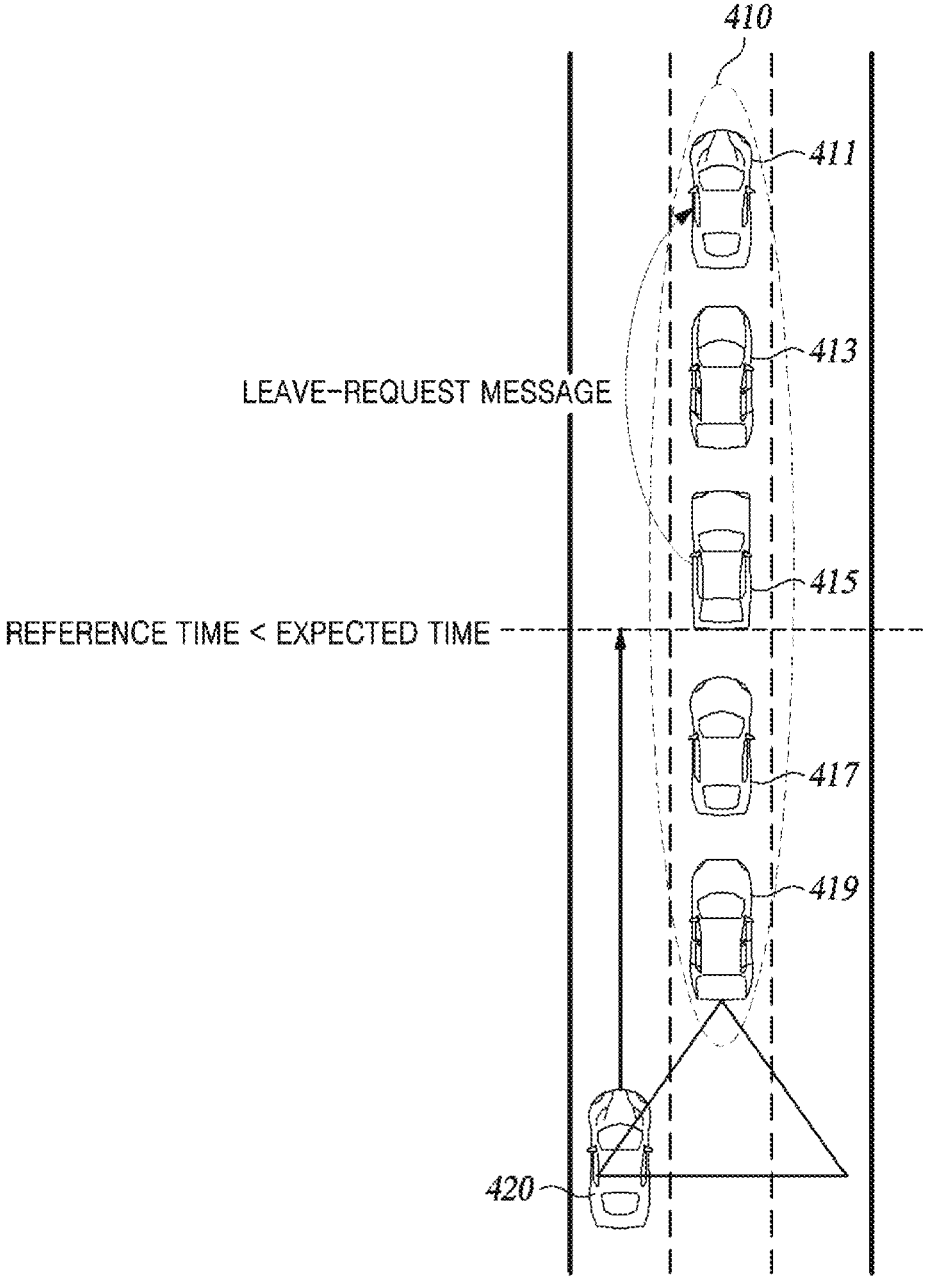
FIG. 4 is a diagram for describing approval determination according to one embodiment of the present disclosure.

FIG. 4 is a diagram for describing the approval determination according to one embodiment of the present disclosure.

Referring to FIG. 4, a vehicle platoon 410, a plurality of vehicles 411, 413, 415, 417, and 419, and another vehicle 420 are illustrated. The plurality of vehicles 411, 413, 415, 417, and 419 include a leader vehicle 411 and member vehicles 413, 415, 417 and 419.

The second member vehicle 415 transmits a leave-request message to the leader vehicle 411.

When the other vehicle 420 is detected in an overtaking lane adjacent to the travel lane of the vehicle platoon 410, the leader vehicle 411 determines an expected time required for the other vehicle 420 to reach the position of the second member vehicle 415 in the lateral direction in response to receiving the leave-request message.

Specifically, the leader vehicle 411 receives travel information of the other vehicle 420 through the member vehicles 413, 415, 417, and 419. The travel information of the other vehicle 420 includes the location, speed, size, type, and the like of the other vehicle 420.

The leader vehicle 411 determines the expected time required for the other vehicle 420 to reach a position parallel to the position of the second member vehicle 415. Specifically, the leader vehicle 411 may identify the horizontal position of the second member vehicle 415 as a parallel position. Here, the horizontal position indicates a Y-axis coordinate of the second member vehicle 415 when the direction of the road is a Y-axis direction. In another example, the leader vehicle 411 may generate a straight line passing through the position of the second member vehicle 415 and perpendicular to the direction of the road, and may identify a point where the straight line and the overtaking lane overlap as a parallel position. Then, the leader vehicle 411 calculates a distance from the position of the other vehicle 420 to the identified parallel position. The leader vehicle 411 determines the time required for the other vehicle 420 to reach the parallel position based on the calculated distance and the speed of the other vehicle 420.

The leader vehicle 411 compares the expected time with a preset reference time, and determines the leave approval according to the comparison result. Here, the reference time may include at least one of a time required for the second member vehicle 415 to change the lane or a time required for the second member vehicle 415 to accelerate to the speed of the other vehicle 420. The reference time may have a value set by a user or a manufacturer as a default value, and may be adjusted by other parameters. According to one embodiment of the present disclosure, the leader vehicle 411 may set the reference time based on at least one of a slope of the road, a curvature of a road, a curved direction of a road, or weather information.

When the expected time takes longer than the reference time, the leader vehicle 411 approves the leaving of the second member vehicle 415. Meanwhile, when the expected time takes less than the reference time, the leader vehicle 411 rejects the leaving of the second member vehicle 415.

When the expected time takes less than the reference time, the leader vehicle 411 determines that there is a risk of collision between the second member vehicle 415 and the other vehicle 420. Meanwhile, when the expected time takes longer than the reference time, the leader vehicle 411 determines that there is no risk of collision with the other vehicle 420 even when the second member vehicle 415 leaves the vehicle platoon 410. For example, when the reference time is 10 seconds and the expected time is 15 seconds, the leader vehicle 411 may determine that there is no risk of collision due to the lane change of the second member vehicle 415. When it is determined that there is no risk of collision, the leader vehicle 411 may allow the leaving of the second member vehicle 415.

The leader vehicle 411 transmits the leave-approval message to the second member vehicle 415.

Through the above-described operations, the leader vehicle 411 may assist the leaving from the vehicle platoon 410 so that the second member vehicle 415 trying to leave the vehicle platoon 410 safely and quickly overtakes the vehicle platoon through an adjacent overtaking lane.

Figure 5:
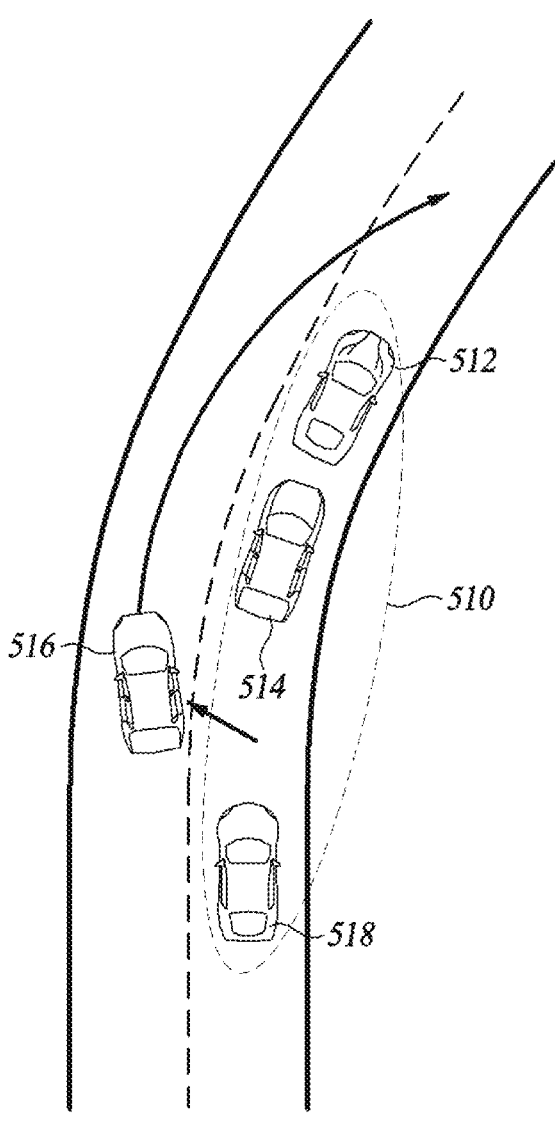
FIG. 5 is a diagram for describing an overtaking situation on a curved road according to one embodiment of the present disclosure.

FIG. 5 is a diagram for describing an overtaking situation on a curved road according to one embodiment of the present disclosure.

Referring to FIG. 5, a vehicle platoon 510 and a plurality of vehicles 512, 514, 516, and 518 are illustrated. The plurality of vehicles 512, 514, 516, and 518 include a leader vehicle 512 and member vehicles 514, 516, and 518.

The second member vehicle 516 is a vehicle trying to leave the vehicle platoon 510.

When the second member vehicle 516 tries to overtake the vehicle platoon 510 on a road curved to the right, it takes more time than a straight road. In another example, when the uphill slope is steep, an acceleration of the second member vehicle 516 slows down, and thus, a time required for the second member vehicle 516 to overtake the vehicle platoon 510 increases. As a result, the risk of collision between the second member vehicle 516 and another vehicle (not illustrated) in the overtaking lane may increase. Even when there is no other vehicle in the overtaking lane, the acceleration performance of the second member vehicle 516 may not be sufficient to overtake the vehicle platoon 510.

In consideration of this situation, the leader vehicle 512 may set a reference time based on at least one parameter of the slope of the road, the curvature of the road, the curved direction of the road, or weather information. The reference time may be set according to a weighted sum of a default value and at least one parameter.

According to one embodiment of the present disclosure, the higher the slope of the road, the larger the size of the reference time may be set. Conversely, the lower the slope of the road, the smaller the size of the reference time may be set.

According to another embodiment of the present disclosure, when the road curves to the right, the size of the reference time may be set large. Conversely, when the road curves to the left, the size of the reference time may be set small.

According to another embodiment of the present disclosure, the size of the reference time may be set to increase as the curvature of the road curved to the right increases. Conversely, as the curvature of the road curved to the left increases, the size of the reference time may be set smaller.

According to another embodiment of the present disclosure, in rainy weather, snowy weather, low temperature, yellow sand, or fog weather conditions, the size of the reference time may be set large. Conversely, in a clear or bright weather condition, the size of the reference time may be set small.

Meanwhile, the leader vehicle 512 sets a reference overtaking time based on at least one of the slope of the road, the curvature of the road, the curved direction of the road, or weather information, determines the overtaking time of the second member vehicle 516, and determines the leaving approval according to the comparison between the overtaking time and the reference overtaking time.

Specifically, the leader vehicle 512 determines the overtaking time of the second member vehicle 516. The overtaking time includes the lane change time of the second member vehicle 516 and the time taken for the second member vehicle 516 to move to the position of the leader vehicle 512. The overtaking time may further include a time required for the second member vehicle 516 to change the lane to a point in front of the leader vehicle 512. The overtaking time may be determined differently according to the preset acceleration or the acceleration capability of the second member vehicle 516.

The leader vehicle 512 sets the reference overtaking time based on at least one of the slope of the road, the curvature of the road, the curved direction of the road, or weather information.

According to the comparison between the overtaking time and the preset reference overtaking time, the leader vehicle 512 may determine the approval for the second member vehicle 516 to leave the vehicle platoon 510. When the leaving approval is executed, the second member vehicle 516 may be accelerated and travel so that the overtaking time is minimized based on the speed of the vehicle platoon 510.

Meanwhile, the leader vehicle 512 may determine the overtaking ability of the second member vehicle 516 according to whether at least one of the slope of the road, the curvature of the road, the curved direction of the road, or weather information satisfies a preset condition and determine the leaving approval according to the overtaking ability. For example, in any one of the situations where the weather is one of the preset weather types, the slope of the road is greater than the preset value, and the curvature of the road curved to the right is greater than the preset value, leader vehicle 512 may reject the leaving of the second member vehicle 516.

In another embodiment, the leader vehicle 512 may determine the approval by considering both the estimated arrival time for the other vehicle to reaches the second member vehicle and the overtaking time of the second member vehicle 516.

As such, the leader vehicle 512 may assist the leaving of the second member vehicle 516 by determining the approval based on the risk of collision or the overtaking time of the second member vehicle 516.

In addition to this, the leader vehicle 512 may control the vehicle platoon 510 to assist the leaving of the vehicle having the approval.

Figure 6:
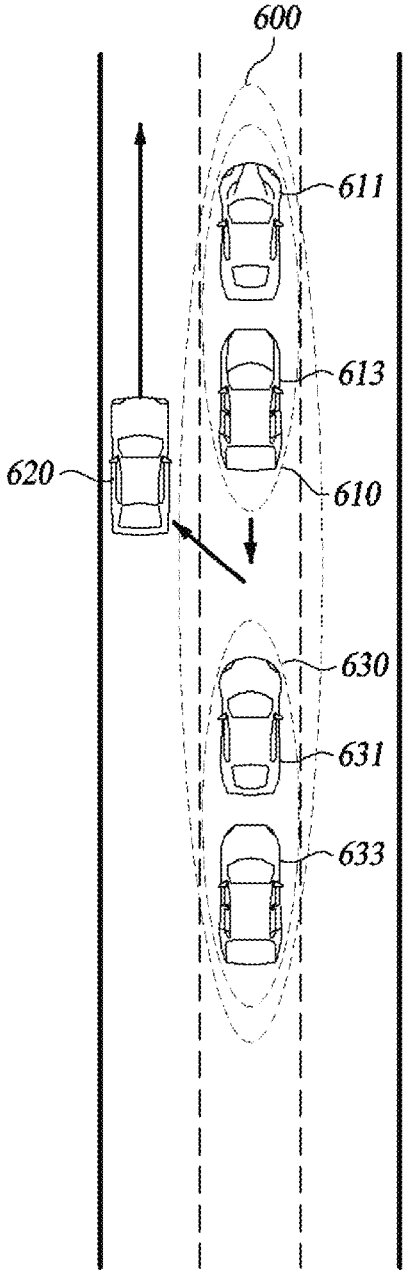
FIG. 6 is a diagram for describing platooning for assisting overtaking of a leaving vehicle according to one embodiment of the present disclosure.

FIG. 6 is a diagram for describing platooning for assisting overtaking of the leaving vehicle according to one embodiment of the present disclosure.

Referring to FIG. 6, a vehicle platoon 600, a first sub-platoon 610, a leaving vehicle 620, and a second sub-platoon 630 are illustrated. The first sub-platoon 610 includes a first leader vehicle 611 and a first member vehicle 613, and the second sub-platoon 630 includes a second leader vehicle 631 and a second member vehicle 633.

The leaving vehicle 620 leaves the vehicle platoon 600, changes the lane to the overtaking lane, and accelerates to overtake the vehicle platoon 600. The vehicle platoon 600 may lower the acceleration of the vehicle platoon 600 to reduce the time for the leaving vehicle 620 to overtake the vehicle platoon 600. When the leaving vehicle 620 attempts to enter a point in front of the vehicle platoon 600, the time taken from leaving of the leaving vehicle 620 to entry may be shortened by acceleration control of the vehicle platoon 600.

According to one embodiment of the present disclosure, when detecting a lane change of the leaving vehicle 620, the first leader vehicle 611 may reduce the acceleration of the vehicle platoon 600. The first leader vehicle 611 may set the maximum acceleration of the vehicle platoon 600 lower than the acceleration of the leaving vehicle 620 and share the set maximum acceleration with vehicles in the vehicle platoon 600.

According to another embodiment of the present disclosure, when detecting a lane change of the leaving vehicle 620, the first leader vehicle 611 may reduce only the acceleration of some vehicles in the vehicle platoon 600.

Specifically, the first leader vehicle 611 sets the first sub-platoon 610 and the second sub-platoon 630. Here, the first sub-platoon 610 refers to a vehicle located in front of the leaving vehicle 620 among the vehicles included in the vehicle platoon 600, and the second sub-platoon 630 refers to a vehicle located behind the leaving vehicle 620 among the vehicles included in the vehicle platoon 600.

The first sub-platoon 610 and the second sub-platoon 630 may be one platoon controlled by the first leader vehicle 611, or may be an individual platoon controlled by each of the first leader vehicle 611 and the second leader vehicle 631.

To assist the overtaking of the leaving vehicle 620, the first leader vehicle 611 may reduce the acceleration of the first sub-platoon 610 of the first sub-platoon 610 and the second sub-platoon 630. The first leader vehicle 611 may set the maximum acceleration of the first sub-platoon 610 lower than the acceleration of the leaving vehicle 620. Due to this, the leaving vehicle 620 may overtake the first sub-platoon 610 more quickly.

Meanwhile, a distance between the first sub-platoon 610 and the second sub-platoon 630 decreases as the acceleration of the first sub-platoon 610 decreases. When the first sub-platoon 610 and the second sub-platoon 630 get closer, the first leader vehicle 611 sets the second member vehicle 613, the second leader vehicle 631, and the second member vehicle 633 to the member vehicle again to form one platoon.

Figure 7:
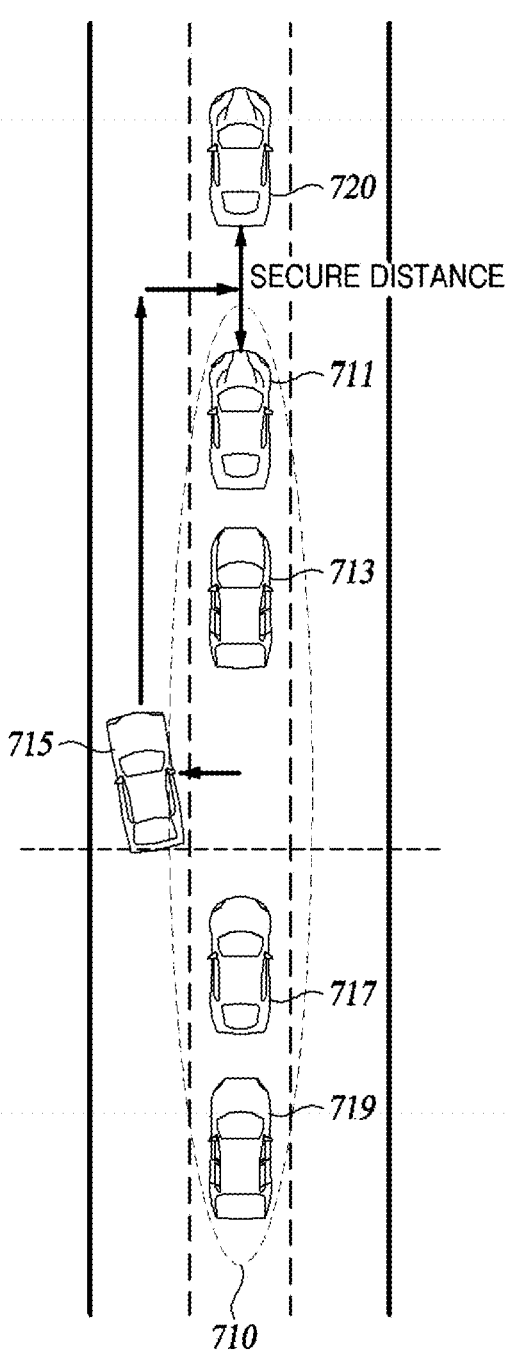
FIG. 7 is a diagram for describing the platooning for assisting the overtaking of the leaving vehicle according to one embodiment of the present disclosure.

FIG. 7 is a diagram for describing the platoon control for assisting the overtaking of the leaving vehicle according to one embodiment of the present disclosure.

Referring to FIG. 7, a vehicle platoon 710, a plurality of vehicles 711, 713, 715, 717, and 719, and a preceding vehicle 720 are illustrated. A plurality of vehicles 711, 713, 715, 717, and 719 include a leader vehicle 711, a leaving vehicle 715, and member vehicles 713, 717, and 719.

The leaving vehicle 715 leaves the vehicle platoon 710, changes the lane to an overtaking lane, overtakes the vehicle platoon 710, and tries to change the lane again to a point in front of the vehicle platoon 710. At this time, when the distance between the preceding vehicle 720 and the vehicle platoon 710, that is, a distance to the leader vehicle 711 is short, it is difficult for the leaving vehicle 715 to move to a point in front of the leader vehicle 711. When the leaving vehicle 715 stays in the overtaking lane for a long time, traffic flow may be disturbed. Accordingly, the leader vehicle 711 may assist overtaking of the leaving vehicle 715 by securing a sufficient distance from the preceding vehicle 720.

Specifically, the leader vehicle 711 detects the preceding vehicle 720 using a sensor or communication module. The leader vehicle 711 determines a target distance between the vehicle platoon 710 and the preceding vehicle 720. The leader vehicle 711 may set the target distance with the preceding vehicle 720 based on the size of the leaving vehicle 715. The leader vehicle 711 controls the travel of the vehicle platoon 710 so that the distance between the vehicle platoon 710 and the preceding vehicle 720 is maintained as much as the target distance.

Figure 8:
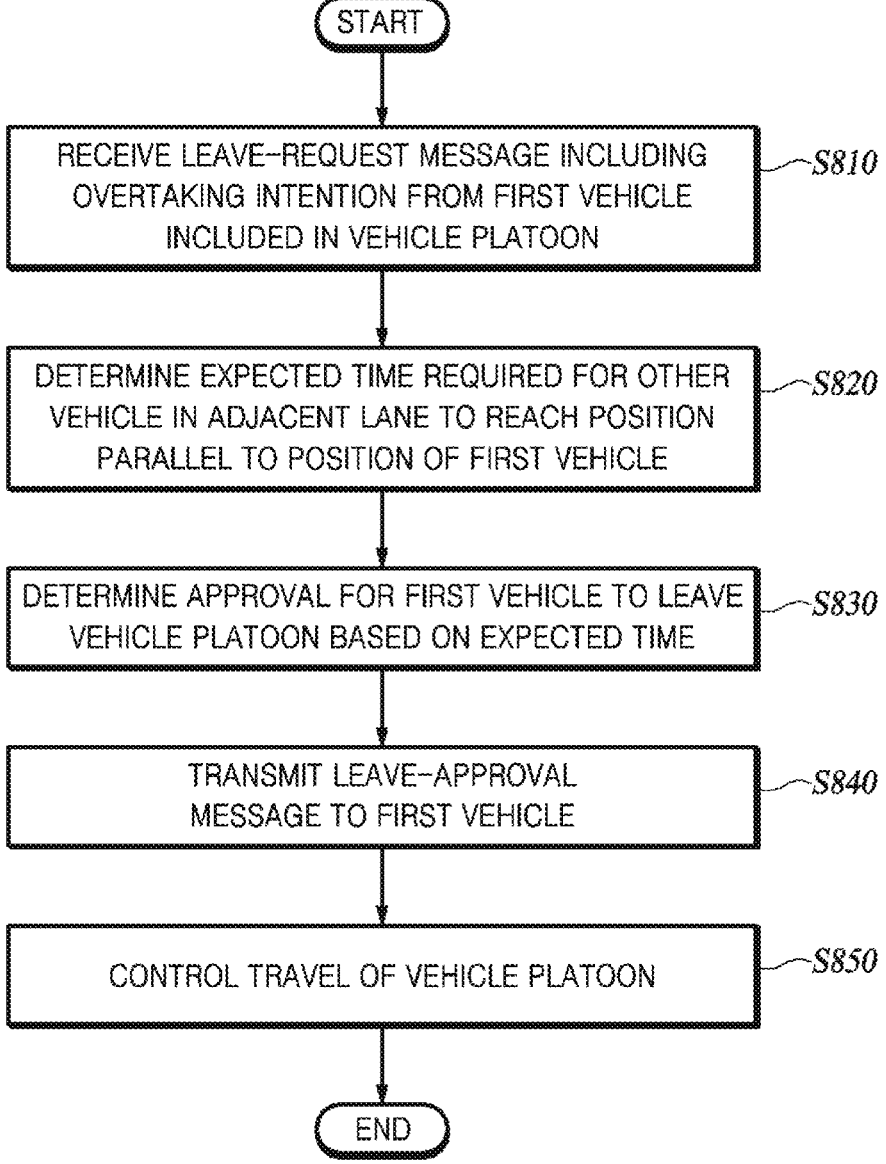
FIG. 8 is a flowchart of a vehicle control method according to one embodiment of the present disclosure.

FIG. 8 is a flowchart of a vehicle control method according to one embodiment of the present disclosure.

Referring to FIG. 8, the vehicle control device receives a leave-request message including an overtaking intention from the first vehicle included in the vehicle platoon (S810).

When there is no other vehicle in the adjacent overtaking lane, the control device may authorize the leaving of the first vehicle.

According to one embodiment of the present disclosure, when there is no other vehicle in an adjacent overtaking lane, the control device may determine an overtaking time of the first vehicle, and may determine the approval for the first vehicle to leave the according to comparison between a reference overtaking time and the overtaking time. Herein, the reference overtaking time is determined based on at least one of the slope of the road, the curvature of the road, the curved direction of the road, and weather information.

When there is other vehicle in an adjacent overtaking lane, the control device determines an expected time required for the other vehicle to reach a position parallel to the position of the first vehicle (S820).

According to one embodiment of the present disclosure, the control device determines the leaving approval based on a comparison between an expected time and a preset reference time. The control device may set the reference time based on at least one of the slope of the road, the curvature of the road, the curved direction of the road, and the weather information.

The control device determines the approval for the first vehicle to leave the vehicle platoon based on the expected time (S830).

When the expected time takes longer than the reference time, the control device approves the leaving of the first vehicle. Meanwhile, when the expected time takes less than the reference time, the control device rejects the leaving of the first vehicle.

The control device transmits the leave-approval message to the first vehicle (S840).

The control device may inform member vehicles of the fact that the leaving of the first vehicle is approved. In addition, the control device may inform the other vehicles and the preceding vehicle in front of the vehicle platoon of the leaving of the first vehicle. As an example, the control device may notify at least one vehicle in the vehicle platoon of the leaving of the first vehicle using a rear light display or wireless communication.

After executing the approval of the first vehicle, the control device controls travel of the vehicle platoon (S850).

In one embodiment, the control device detects a lane change of the first vehicle to the overtaking lane. In one embodiment, upon detecting the lane change of the first vehicle, the control device reduces the acceleration of the vehicle platoon. In another embodiment, when the lane change of the first vehicle is detected, the control device may reduce an acceleration of vehicles located in front of the first vehicle among vehicles included in the vehicle platoon.

In one embodiment, in order to assist the first vehicle so that the first vehicle enters the original lane again after overtaking the vehicle platoon, the control device secures a distance to the preceding vehicle. Specifically, the control device detects the preceding vehicle in front of the vehicle platoon and determines a target distance between the vehicle platoon and the preceding vehicle. The control device may set the target distance based on the size of the first vehicle. The control device may control the travel of the vehicle platoon so that the distance between the vehicle platoon and the preceding vehicle is maintained as much as the target distance.

According to the method and the device for controlling a vehicle platoon of one embodiment, it is possible to assist leaving of a member vehicle trying to leave the vehicle platoon from the vehicle platoon so that the member vehicle safely and quickly overtakes the vehicle platoon through an adjacent overtaking lane.

According to the method and the device for controlling a vehicle platoon of one embodiment, it is possible to reduce a time for a vehicle that has left the vehicle platoon to overtake the vehicle platoon, thereby smoothening traffic flow.

At least some of the components described in the exemplary embodiments of the present disclosure may be implemented as hardware elements including at least one of a Digital Signal Processor (DSP), a processor, a controller, an Application-Specific IC (ASIC), a programmable logic devices (FPGA, etc.), other electronic components, or a combination thereof. Moreover, at least some of the functions or processes described in the exemplary embodiments may be implemented as software, and the software may be stored in a recording medium. At least some of the components, functions, and processes described in the exemplary embodiments of the present disclosure may be implemented as a combination of hardware and software.

The method according to the exemplary embodiments of the present disclosure may be written as a program that can be executed on a computer and may also be implemented as various recording media such as magnetic storage media, optical reading media, digital storage media, etc.

Various techniques described herein may be implemented in digital electronic circuitry, or in computer hardware, firmware, software, or combinations thereof. Implementations may be in the form of a computer program tangibly embodied in a computer program product, i.e., an information carrier, e.g., a machine-readable storage device (computer-readable medium) or a propagated signal, for processing by, or controlling, the operation of, a data processing device, e.g., a programmable processor, a computer, or a number of computers. A computer program, such as the above-mentioned computer program(s), may be written in any form of programming language, including compiled or interpreted languages and may be deployed in any form, including as a stand-alone program or as a module, component, subroutine, or other unit suitable for use in a computing environment. The computer program may be deployed to run on a single computer or multiple computers at one site or distributed across multiple sites and interconnected by a communications network.

In addition, components of the present disclosure may use an integrated circuit structure such as a memory, a processor, a logic circuit, a look-up table, and the like. These integrated circuit structures execute each of the functions described herein through the control of one or more microprocessors or other control devices. In addition, components of the present disclosure may be specifically implemented by a program or a portion of a code that includes one or more executable instructions for performing a specific logical function and is executed by one or more microprocessors or other control devices. In addition, components of the present disclosure may include or be implemented as a Central Processing Unit (CPU), a microprocessor, etc. that perform respective functions. In addition, components of the present disclosure may store instructions executed by one or more processors in one or more memories.

Processors suitable for processing computer programs include, by way of example, both general purpose and special purpose microprocessors, as well as one or more processors of any kind of digital computer. Generally, a processor will receive instructions and data from a read-only memory or a random access memory or both. The essential elements of a computer may include at least one processor that executes instructions and one or more memory devices that store instructions and data. Generally, a computer will also include, or be operatively coupled to receive data from or transfer data to, or both, one or more mass storage devices for storing data, e.g., magnetic, magneto optical disks, or optical disks.

Information carriers suitable for embodying computer program instructions and data include, by way of example, semiconductor memory devices, e.g., Magnetic Media such as hard disks, floppy disks, and magnetic tapes, Optical Media such as Compact Disk Read Only Memories (CD-ROMs) and Digital Video Disks (DVDs), Magneto-Optical Medial such as Floptical Disks, Read Only Memories (ROMs), Random Access Memories (RAMs), flash memories, Erasable Programmable ROMs (EPROMs), Electrically Erasable Programmable ROMs (EEPROM), etc. The processor and the memory may be supplemented by, or incorporated in, special purpose logic circuitry.

The processor may execute an Operating System and software applications executed on the Operating System. Moreover, a processor device may access, store, manipulate, process, and generate data in response to software execution. For the sake of convenience, there is a case where a single processor device is used, but those skilled in the art will understand that the processor device can include multiple processing elements and/or multiple types of processing elements. For example, the processor device may include a plurality of processors or a single processor and a single controller. Other processing configurations, such as such as parallel processors, are also possible.

In addition, non-transitory computer-readable media may be any available media that can be accessed by a computer, and may include both computer storage media and transmission media.

This specification includes details of various specific implementations, but they should not be understood as limiting the scope of any invention or what is claimed, and should be understood as descriptions of features that may be unique to particular embodiments of a particular invention. In the context of individual embodiments, specific features described herein may also be implemented in combination with a single embodiment. On the contrary, various features described in the context of a single embodiment can also be implemented in multiple embodiments independently or in any appropriate sub-combination. Further, although the features may operate in a particular combination and may be initially described as so claimed, one or more features from the claimed combination may be in some cases excluded from the combination, and the claimed combination may be modified into a sub-combination or a variation of the sub-combination.

Likewise, although the operations are depicted in the drawings in a particular order, it should not be understood that such operations must be performed in that particular order or sequential order shown to achieve the desirable result or that all the depicted operations should be performed. In certain cases, multitasking and parallel processing may be advantageous. Moreover, the separation of various device components of the above-described embodiments should not be understood as requiring such separation in all embodiments, and it should be understood that the described program components and devices can generally be integrated together in a single software product or packaged into multiple software products.

The foregoing description is merely illustrative of the technical concept of the present embodiments. Various modifications and changes may be made by those of ordinary skill in the art without departing from the essential characteristics of each embodiment. Therefore, the present embodiments are not intended to limit but to describe the technical idea of the present embodiments. The scope of the technical concept of the embodiments is not limited by these embodiments. The scope of protection of the various embodiments should be construed by the following claims. All technical ideas that fall within the scope of equivalents thereof should be interpreted as being included in the scope of the present embodiments.

What is claimed is:

1. A method of controlling a vehicle for assisting leaving from a vehicle platoon, the method comprising:
    receiving a leave-request message including an overtaking intention from a first vehicle included in the vehicle platoon;
    determining approval for the first vehicle to leave based on an expected time required for another vehicle in an adjacent lane to reach a position parallel to a position of the first vehicle;
    transmitting a leave-approval message to the first vehicle; and generating one or more sub-groups of vehicles belonging to the vehicle platoon based on a location of the first vehicle in the vehicle platoon;

reducing accelerations of vehicles in at least one sub-group located in front of the first vehicle in the vehicle platoon based on a distance between the one or more sub-groups in response to a detection of a lane change of the first vehicle so that the first vehicle leaves the vehicle platoon, wherein maximum accelerations of the vehicles in at least one sub-group located in front of the first vehicle in the vehicle platoon are set lower than an acceleration of the first vehicle, wherein the vehicles in at least one sub-group remain in the same lane.

2. The method of claim 1, wherein the determining of the approval includes determining the approval based on comparison between the expected time and a preset reference time.

3. The method of claim 2, wherein the determining of the approval includes setting the preset reference time based on at least one of a slope of a road, a curvature of a road, a curved direction of the road, or weather information.

4. The method of claim 1, wherein the determining of the approval includes:

determining an overtaking time of the first vehicle; and determining the approval according to comparison between a reference overtaking time and the overtaking time, wherein the reference overtaking time is determined based on at least one of a slope of a road, a curvature of a road, a curved direction of a road, and weather information.

5. The method of claim 1, further comprising reducing an acceleration of the vehicle platoon in response to a detection of a lane change of the first vehicle.

6. The method of claim 1, further comprising:

detecting a preceding vehicle in front of the vehicle platoon;

determining a target distance between the vehicle platoon and the preceding vehicle based on a size of the first vehicle; and controlling traveling of the vehicle platoon based on the determined target distance.

7. The method of claim 1, further comprising notifying other vehicle in the vehicle platoon of the leaving of the first vehicle.

8. A device for controlling a vehicle for assisting leaving from a vehicle platoon, the device comprising:

a processor configured to communicate with at least vehicles set to the vehicle platoon; and a controller configured to receive a leave-request message including an overtaking intention from a first vehicle included in the vehicle platoon through the processor, determine approval for the first vehicle to leave based on an expected time required for another vehicle in an adjacent lane to reach a position parallel to a position of the first vehicle, and transmit a leave-approval message to the first vehicle, wherein the controller is configured to generate one or more sub-groups of vehicles belonging to the vehicle platoon based on a location of the first vehicle in the vehicle platoon and reduce accelerations of vehicles in at least one sub-group located in front of the first vehicle in the vehicle platoon based on a distance between the one or more sub-groups in response to a detection of a lane change of the first vehicle so that the first vehicle leaves the vehicle platoon, wherein maximum accelerations of the vehicles in at least one sub-group located in front of the first vehicle in the vehicle platoon are set lower than an acceleration of the first vehicle, wherein the vehicles in at least one sub-group remain in the same lane.

9. The device of claim 8, wherein the controller is configured to determine the approval based on comparison between the expected time and a preset reference time.

10. The device of claim 9, wherein the controller is configured to set the preset reference time based on at least one of a slope of a road, a curvature of a road, a curved direction of the road, or weather information.

11. The device of claim 8, wherein the controller is configured to determine an overtaking time of the first vehicle and determine the approval according to comparison between a reference overtaking time and the overtaking time, wherein the overtaking time is determined based on at least one of a slope of a road, a curvature of a road, a curved direction of a road, and weather information.

12. The device of claim 8, wherein the controller is configured to reduce an acceleration of the vehicle platoon in response to a detection of a lane change of the first vehicle.

13. The device of claim 8, wherein the controller is configured to detect a preceding vehicle in front of the vehicle platoon, determine a target distance between the vehicle platoon and the preceding vehicle based on a size of the first vehicle, and control traveling of the vehicle platoon based on the determined target distance.

* * * * *